United States Patent [19]

Yabuta et al.

[11] Patent Number: 5,719,234
[45] Date of Patent: Feb. 17, 1998

[54] HIGH SOLID COATING COMPOSITION AND METHOD FOR FORMING TOPCOAT USING SAME

[75] Inventors: Motoshi Yabuta, Hadano; Masaaki Saika, Hiratsuka; Satoru Ito, Kanagawa-ken; Hiroyuki Okada, Hiratsuka; Yasumasa Okumura; Hiroshi Igarashi, both of Yokohama; Satoshi Ikushima, Hiratsuka, all of Japan

[73] Assignee: Kansai Paint Company, Limited, Amagasaki, Japan

[21] Appl. No.: 747,341

[22] Filed: Nov. 12, 1996

[30] Foreign Application Priority Data

Nov. 20, 1995 [JP] Japan .................... 7-301399

[51] Int. Cl.$^6$ ............................................ C08L 83/04
[52] U.S. Cl. .................... 525/101; 525/103; 525/208; 525/209; 427/407.1; 428/389; 428/384; 428/447
[58] Field of Search ........................ 525/101, 103, 525/208, 209; 428/389, 384, 447

[56] References Cited

U.S. PATENT DOCUMENTS

| | | | |
|---|---|---|---|
| 3,003,992 | 10/1961 | Mabrey et al. | 525/103 |
| 4,044,070 | 8/1977 | Labana et al. | 525/103 |
| 4,091,048 | 5/1978 | Labana et al. | 525/103 |
| 4,446,259 | 5/1984 | Vasta et al. | 525/103 |
| 5,063,114 | 11/1991 | Nambu et al. | 428/447 |
| 5,166,265 | 11/1992 | Nakahata et al. | 525/101 |
| 5,464,901 | 11/1995 | Yoshikawa et al. | 525/103 |
| 5,530,063 | 6/1996 | Nagai et al. | 525/103 |

*Primary Examiner*—Ralph H. Dean
*Attorney, Agent, or Firm*—Armstrong, Westerman, Hattori, McLeland & Naughton

[57] ABSTRACT

An object of the present invention is to provide a heat-curable high solid coating composition capable of forming a coating film which is excellent in both acid resistance and scratch resistance, and a method for forming a topcoat using said composition.

The present invention provides a heat-curable high solid coating composition comprising:
(A) a carboxyl-containing compound,
(B) a vinyl polymer having an epoxy group, a hydroxyl group and a hydrolyzable alkoxysilyl group in one molecule,
(C) a reactive organopolysiloxane, and
(D) a crosslinked particulate polymer. The present invention also provides a method for forming a topcoat using said composition.

13 Claims, No Drawings

HIGH SOLID COATING COMPOSITION AND METHOD FOR FORMING TOPCOAT USING SAME

The present invention relates to a novel heat-curable high solid coating composition and a method for forming a topcoat using same.

Heat-curable topcoat compositions comprising a hydroxyl-containing acrylic resin and a melamine resin have been heretofore chiefly used for coating automotive exterior panels. However, in recent years, acid rain has posed a world-wide problem of etching and blots or like stains on coating films. With the increasing spread of car washers, scratches made on automobiles by car washers have presented another problem. In this situation, there is a need for topcoat compositions, particularly clear topcoat compositions, which are capable of forming coating films satisfactory in acid resistance and scratch resistance.

Usually scratch resistance is imparted to a coating film by increasing the crosslinking density of the film. On the other hand, a coating film can be made acid resistant by incorporating an acid resistant crosslinking system into the film. However, a method has been scarcely proposed for giving both acid resistance and scratch resistance to a coating film.

For example, Japanese Unexamined Patent Publication No. 222,753/1990 discloses that a coating film having high crosslinking density, and thus having high scratch resistance, can be obtained by baking an acrylic resin of high hydroxyl value in the presence of a monomeric melamine resin and an acid catalyst. However, this crosslinking system has a drawback of poor acid resistance since the coating film crosslinked by a melamine resin readily decomposes when contacted with an acid.

Methods have been proposed for imparting both acid resistance and scratch resistance to a coating film by incorporating an acid-resistant crosslinking system to a less acid-resistant melamine resin crosslinking system. The proposed systems include, for example, a composite crosslinking system having a combination of carboxyl group/epoxy group/hydroxyl group/melamine resin (Japanese Unexamined Patent Publication No. 247,264/1990), a composite crosslinking system having a combination of hydroxyl group/alkoxysilyl group/melamine resin (WO91/16,383), etc. However, these systems have not invariably achieved satisfactory improvements in acid resistance because of the presence of a melamine resin.

On the other hand, melamine resin-free crosslinking systems have been proposed. The proposals include a crosslinking system having only a combination of carboxyl group/epoxy group or carboxyl group/epoxy group/hydroxyl group (e.g., Japanese Unexamined Patent Publications Nos. 87,288/1987, 45,577/1990 and 287,650/1991). Yet, these systems have a shortcoming that the resulting coating films, although superior in acid resistance, are inferior in scratch resistance owing to the low crosslinking density of the cured film.

A resin composition comprising a carboxyl-containing vinyl polymer and an epoxy- and hydrolyzable silyl group-containing compound is known as a crosslinking system having a combination of carboxyl group/epoxy group/hydrolyzable silyl group (Japanese Unexamined Patent Publication No. 187,749/1987), but this composition has a defect that the curing reaction of the polymer with the compound is unsatisfactory because of the steric hindrance caused by the presence of the epoxy group and hydrolyzable silyl group in the same molecule.

A resin composition comprising a hydroxyl- and carboxyl-containing silicone polymer, a carboxyl- and carboxylic acid ester group-containing polymer and a hydroxyl- and epoxy-containing polymer has been proposed as a crosslinking system having a combination of carboxyl group/epoxy group/hydroxyl group which contains the silicone polymer as a base resin (Japanese Unexamined Patent Publication No. 166,741/1994). The cured coating of this composition is defective in that it is not always fully satisfactory in crosslinking density and is poor in the recoat adhesion which is one of the important characteristics of coating compositions for automotive exterior panels.

On the other hand, it is of urgent necessity in the field of coating compositions to take measures for the control on the use of solvents, from the viewpoints of prevention of air pollution and conservation of resources.

Such measures include development of high solid coating compositions which contain less amount of solvents and have a higher solid concentration. Most of the high solid coating compositions developed at present comprise a hydroxyl-containing resin, and a melamine resin as a curing agent. Said compositions have the following drawbacks. First, it is necessary to reduce the viscosity of the hydroxyl-containing resin and the melamine resin in order to achieve a high solid concentration, but if the molecular weight of these resins is decreased for reducing the viscosity, the resulting coating film has inferior film performance. For achieving satisfactory film performance using the resins with a lower molecular weight, the resins must have a higher content of crosslinkable functional groups such as hydroxyl group and methylol group. However, it is difficult to reduce the viscosity of the resins with a high content of crosslinkable functional groups, since the functional groups generally increase the viscosity of the resins by the interaction therebetween. Second, when using as a high solid coating composition the above composition to be cured with a melamine resin, the coating film is likely to have "foaming" since a large amount of alcohol or like byproducts are formed when cured by heating.

An object of the present invention is to provide a novel heat-curable high solid coating composition free of the foregoing prior art drawbacks, and a method of forming a topcoat using said composition.

Another object of the invention is to provide a novel heat-curable high solid coating composition which is capable of forming a coating film excellent in both acid resistance and scratch resistance, and a method for forming a topcoat using said composition.

A further object of the invention is to provide a novel heat-curable high solid coating composition excellent in low-temperature curability, storage stability and recoat adhesion, and a method for forming a topcoat using said composition.

These and other objects of the invention will become apparent from the following description.

The present invention provides a heat-curable high solid coating composition comprising:

(A) a carboxyl-containing compound,
(B) a vinyl polymer having an epoxy group, a hydroxyl group and a hydrolyzable alkoxysilyl group in one molecule,
(C) a reactive organopolysiloxane, and
(D) a crosslinked particulate polymer, and a method for forming a topcoat comprising the step of successively forming a colored base coat and a clear topcoat on a substrate, said colored base coat and/or clear topcoat being formed from the above coating composition.

The inventors of the present invention conducted extensive research to achieve the above objects and found that the foregoing objects can be achieved by a heat-curable high solid coating composition comprising a carboxyl-containing compound (A), the above-specified polymer (B), a reactive organopolysiloxane (C), and a crosslinked particulate polymer (D). The present invention has been completed based on this novel finding.

The components of the curable coating composition according to the invention will be specifically described below.

The compound (A) for use in the invention contains a carboxyl group and usually has an acid value of 50 to 500 mg KOH/g, preferably 80 to 300 mg KOH/g.

An acid value of less than 50 mg KOH/g in the compound (A) is likely to lower the curability of the resulting composition and to thereby reduce the acid resistance and scratch resistance of the coating film. On the other hand, an acid value of more than 500 mg KOH/g tends to decrease the compatibility with the polymer (B) and the reactive organopolysiloxane (C) and to thereby reduce the storage stability of the composition. Hence an acid value of the polymer (A) outside said range is undesirable. The following compounds (A-1) to (A-3) are usable as the compound (A).

(A-1): a vinyl polymer having, in a molecule, a group formed by half esterification of an acid anhydride group The group formed by half esterification of an acid anhydride group consists of a carboxyl group and a carboxylic acid ester group, and is obtained by subjecting an acid anhydride group and an aliphatic monohydric alcohol to addition reaction for ring opening, namely half esterification. Hereinafter the group may be referred to simply as "half ester group".

The compound (A-1) can be easily prepared by copolymerizing a vinyl monomer having a half ester group and other vinyl monomers in the conventional manner, or by the same copolymerization with the exception of using a vinyl monomer having an acid anhydride group in place of the vinyl monomer having a half ester group, followed by half esterification of the acid anhydride group.

Useful vinyl monomers having an acid anhydride group are, for example, a maleic anhydride, an itaconic anhydride or the like. Useful vinyl monomers having a half ester group are, for example, those prepared by half esterification of the acid anhydride group of the acid anhydride group-containing vinyl monomer.

The half esterification can be done either before or after the copolymerization reaction, as described above. Examples of aliphatic monohydric alcohols useful in the half esterification are low-molecular-weight monohydric alcohols such as methanol, ethanol, isopropanol, t-butanol, isobutanol, methyl cellosolve, ethyl cellosolve, etc. The half esterification reaction is conducted in the conventional manner at a temperature ranging from room temperature to about 80° C., if necessary in the presence of tertiary amine serving as a catalyst.

Examples of said other vinyl monomers are hydroxyl-containing vinyl monomers; (meth)acrylic acid esters; vinyl ethers and aryl ethers; olefin compounds and diene compounds; hydrocarbon ring-containing unsaturated monomers; and nitrogen-containing unsaturated monomers; etc.

Examples of the hydroxyl-containing monomers are $C_{2-8}$ hydroxyalkyl esters of acrylic or methacrylic acids, such as 2-hydroxyethyl (meth)acrylate, 2-hydroxypropyl (meth) acrylate, 3-hydroxypropyl (meth)acrylate, hydroxybutyl (meth)acrylate, etc.; monoesters of (meth)acrylic acid or like unsaturated carboxylic acids with polyethylene glycol, polypropylene glycol, polybutylene glycol or like polyether polyols; monoethers of 2-hydroxyethyl (meth)acrylate or like hydroxyl-containing unsaturated monomers with polyethylene glycol, polypropylene glycol, polybutylene glycol or like polyether polyols; monoesterification products or diesterification products of maleic anhydride, itaconic anhydride or like acid anhydride group-containing unsaturated compounds with ethylene glycol, 1,6-hexanediol, neopentyl glycol or like glycols; hydroxyethyl vinyl ether or like hydroxyalkyl vinyl ethers; allyl alcohols and the like; adducts of $\alpha,\beta$-unsaturated carboxylic acid with CARDULA E10 (tradename, product of Shell Petrochemical Co., Ltd.), $\alpha$-olefin epoxide or like monoepoxy compounds; and adducts of glycidyl (meth)acrylate with acetic acid, propionic acid, p-tert-butylbenzoic acid, aliphatic acid or like monobasic acids; adducts of the above hydroxyl-containing monomers with lactones (e.g., $\epsilon$-caprolactone, $\gamma$-valerolactone, etc.); and the like.

Examples of (meth)acrylic acid esters are $C_{1-24}$ alkyl esters or cycloalkyl esters of acrylic or methacrylic acids, such as methyl acrylate, ethyl acrylate, propyl acrylate, isopropyl acrylate, n-butyl acrylate, isobutyl acrylate, t-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, t-butyl methacrylate, hexyl methacrylate, 2-ethylhexyl methacrylate, octyl methacrylate, decyl methacrylate, lauryl methacrylate, stearyl methacrylate, cyclohexyl methacrylate, etc.; $C_{2-18}$ alkoxyalkyl esters of acrylic or methacrylic acids, such as methoxybutyl acrylate, methoxybutyl methacrylate, methoxyethyl acrylate, methoxyethyl methacrylate, ethoxybutyl acrylate, ethoxybutyl methacrylate, etc.; and the like.

Examples of vinyl ethers and aryl ethers are ethyl vinyl ether, n-propyl vinyl ether, isopropyl vinyl ether, butyl vinyl ether, t-butyl vinyl ether, pentyl vinyl ether, hexyl vinyl ether, octyl vinyl ether and like chain-like alkyl vinyl ethers; cyclopentyl vinyl ether, cyclohexyl vinyl ether and like cycloalkyl vinyl ethers; phenyl vinyl ether, trivinyl ether and like aryl vinyl ethers; benzyl vinyl ether, phenethyl vinyl ether and like aralkyl vinyl ethers; allyl glycidyl ether, allyl ethyl ether and like allyl ethers; etc.

Examples of olefin compounds and diene compounds are ethylene, propylene, butylene, vinyl chloride, butadiene, isoprene, chloroprene, etc.

Examples of hydrocarbon ring-containing unsaturated monomers are styrene, $\alpha$-methylstyrene, phenyl (meth) acrylate, phenylethyl (meth)acrylate, phenylpropyl (meth) acrylate, benzyl (meth)acrylate, phenoxyethyl (meth) acrylate, cyclohexyl (meth)acrylate, 2-acryloyloxyethylhydrogen phthalate, 2-acryloyloxypropyl-hydrogen phthalate, 2-acryloyloxypropylhexahydrohydrogen phthalate, 2-acryloyloxypropyltetrahydrohydrogen phthalate, ester of p-t-butyl-benzoic acid with hydroxyethyl (meth)acrylate, dicyclopentenyl (meth)acrylate, etc.

Examples of nitrogen-containing unsaturated monomers are nitrogen-containing alkyl (meth)acrylates such as N,N-dimethyLaminoethyl (meth)acrylate, N,N-diethylaminoethyl (meth)acrylate, N-t-butylaminoethyl (meth)acrylate, etc.; polymerizable amides such as acrylamide, methacrylamide, N-methyl (meth)acrylamide, N-ethyl (meth)acrylamide, N,N-dimethyl (meth)acrylamide, N,N-dimethylaminopropyl (meth)acrylamide, N,N-dimethylaminoethyl (meth)acrylamide, etc.; aromatic nitrogen-containing monomers such as 2-vinylpyridine, 1-vinyl-2-pyrrolidone, 4-vinylpyridine, etc.; polymerizable nitriles such as acrylonitrile, methacrylonitrile, etc.; allylamines; and so on.

The copolymerization can be carried out by conventional methods for copolymerization of vinyl monomers. The most suitable method is solution type radical polymerization carried out in an organic solvent, in view of application range and costs. Stated more specifically, the desired polymer can be easily obtained by copolymerization at a temperature of about 60° to about 150° C. in an organic solvent in the presence of a polymerization initiator such as azobisisobutyronitrile, benzoyl peroxide or the like. Useful organic solvents include aromatic solvents such as xylene and toluene, ketone solvents such as methyl ethyl ketone and methyl isobutyl ketone, ester solvents such as ethyl acetate, butyl acetate, isobutyl acetate and 3-methoxybutyl acetate, and alcohols such as n-butanol and isopropyl alcohol, etc.

The half ester group- or acid anhydride group-containing vinyl monomer and other vinyl monomer are copolymerized in the following proportions based on the total weight of the monomers. The proportion of the half ester group- or acid anhydride group-containing vinyl monomer is about 5 to about 40% by weight, preferably about 10 to about 30% by weight, in view of curability and storage stability. The proportion of the other vinyl monomer is about 60 to about 95% by weight, preferably about 70 to about 90% by weight. Of the other vinyl monomers, styrene is used suitably in a proportion of up to about 20% by weight in view of the weatherability of the cured coating. When an acid anhydride group-containing vinyl monomer is used, half esterification is carried out after copolymerization as described above.

The compound (A-1) is preferably an acrylic polymer having a number average molecular weight of 2,000 to 10,000. A number average molecular weight of less than 2,000 tends to impair the weatherability of the cured coating, whereas a number average molecular weight exceeding 10,000 tends to reduce the compatibility with the polymer (B) and the reactive organopolysiloxane (C). Hence a number average molecular weight of the compound (A-1) outside said range is undesirable.

(A-2): carboxyl-containing polyester polymer

The number average molecular weight of the carboxyl-containing polyester polymer (A-2) is not limited specifically, but preferably about 1,500 to about is 2,000.

The carboxyl-containing polyester polymer can be easily prepared by condensation reaction of a polyhydric alcohol with a polycarboxylic acid. Useful polyhydric alcohols include, for example, ethylene glycol, butylene glycol, 1,6-hexanediol, trimethylolpropane, pentaerythritol, etc. Useful polycarboxylic acids include, for example, adipic acid, terephthalic acid, isophthalic acid, phthalic anhydride, hexahydrophthalic anhydride, etc. Stated more specifically, the carboxyl-containing polyester polymer can be prepared, for example, by a one-step reaction using a reaction system containing excess carboxyl group of a polycarboxylic acid, or by a reaction using a reaction system containing excess hydroxyl group of a polyhydric alcohol to give a hydroxyl-terminated polyester polymer, followed by an addition reaction of the polymer with an acid anhydride group-containing compound such as phthalic anhydride, hexahydrophthalic anhydride, succinic anhydride, etc.

A hydroxyl group may be introduced into the carboxyl-containing polyester polymer to an extent of a hydroxyl value of 0 to 100 mg KOH/g to increase the compatibility with the polymer (B) and the reactive polyorganosiloxane (C) and to thereby make the polymer reactive with the hydrolyzable alkoxysilyl group in the polymer (B). The introduction of a hydroxyl group can be effected by intermitting the condensation reaction in the presence of excess carboxyl group, or by the addition reaction of the hydroxyl-terminated polyester polymer prepared in the presence of excess hydroxyl group with an acid anhydride group-containing compound in an amount less than the hydroxyl group.

(A-3): A half ester formed by an addition reaction of polyol with 1,2-acid anhydride The number average molecular weight of the half ester (A-3) is not limited specifically, but usually as low as about 400 to about 1,000. Said half ester is highly reactive with an epoxy group and useful for forming a high solid coating composition.

Said half ester is obtained by reacting a polyol with 1,2-acid anhydride under conditions which can effect the ring-opening reaction of the acid anhydride but substantially do not cause polyesterification reaction. The product of such reaction has a low molecular weight and narrow molecular weight distribution. Further, the product has a low volatile organic content when contained in a composition and imparts excellent properties to the resulting coating film.

The half ester is prepared by the reaction of a polyol with 1,2-acid anhydride in an inert atmosphere, such as nitrogen atmosphere, in the presence of a solvent. Preferred solvents are ketones such as methyl amyl ketone, diisobutyl ketone, methyl isobutyl ketone and the like; aromatic hydrocarbons such as toluene, xylene and the like; and other organic solvents such as dimethylformamide, N-methylpyrrolidone and the like.

The reaction is carried out preferably at a low temperature of about 150° C. or less. Specifically stated, the reaction temperature is preferably about 70° to about 150° C., more preferably about 90° to about 120° C. A temperature exceeding 150° C. causes polyesterification reaction, whereas a temperature less than 70° C. results in unsatisfactory reaction rate. Hence, reaction temperatures outside the specified range are not desirable.

The reaction time slightly varies basically depending on the reaction temperature, but is usually about 10 minutes to about 24 hours.

For obtaining the desired half ester in the maximum yield, the equivalent ratio of the acid anhydride to the polyol is about 0.8:1 to about 1.2:1, when calculating the acid anhydride as a monofunctional compound.

The acid anhydride for use in the preparation of the desired half ester has about 2 to about 30 carbon atoms excluding the carbon atoms in the acid moiety. Examples of such acid anhydrides are aliphatic, alicyclic, olefin and cyclic olefin acid anhydrides and aromatic acid anhydrides. The aliphatic and aromatic acid anhydrides include substituted aliphatic acid anhydrides and substituted aromatic acid anhydrides, insofar as the substituents do not adversely affect the reactivity of the acid anhydride or the properties of the resulting half ester. Examples of the substituents are chloro, alkyl and alkoxy groups. Examples of the acid anhydrides are succinic anhydride, methylsuccinic anhydride, dodecenylsuccinic anhydride, octadecenyl-succinic anhydride, phthalic anhydride, tetrahydro-phthalic anhydride, methyltetrahydrophthalic anhydride, hexahydrophthalic anhydride, alkylhexahydrophthalic anhydride (such as methylhexahydrophthalic anhydride), tetrafluorophthalic anhydride, endomethylenetetra-hydrophthalic anhydride, chlorendic anhydride, itaconic anhydride, citraconic anhydride and maleic anhydride.

Usable polyols are those having about 2 to about 20 carbon atoms. Preferably usable are diols, triols, mixtures thereof, and like polyols having 2 to 10 carbon atoms. Preferable examples are aliphatic polyols such as ethylene glycol, 1,2-propanediol, 1,3-propanediol, 1,4-butanediol, 1,5-pentanediol, glycerol, 1,2,3-butane triol, 1,6-hexanediol, neopentyl glycol, diethylene glycol, dipropylene glycol, 1,4-cyclohexane dimethanol, 3-methyl-1,5-pentanediol, trimethylolpropane, 2,2,4-trimethylpentane-1,3-diol, pentaerythritol and 1,2,3,4-butanetetraol. Aromatic polyols such as bisphenol A and bis (hydroxymethyl)xylene are also usable.

The polymer (B) for use in the present invention is a vinyl polymer having an epoxy group, a hydroxyl group and a hydrolyzable alkoxysilyl group in one molecule.

The polymer (B) can be easily prepared by copolymerizing an epoxy-containing vinyl monomer, a hydroxyl-containing vinyl monomer, a hydrolyzable alkoxysilyl group-containing vinyl monomer and other vinyl monomer by the same conventional method as in the preparation of the compound (A-1).

Examples of the epoxy-containing vinyl monomer are glycidyl (meth)acrylate, allyl glycidyl ether and the like. Examples of the hydrolyzable alkoxysilyl group-containing vinyl monomer are vinyltrimethoxysilane, vinylmethyldimethoxysilane, vinyltriethoxysilane, vinylmethyldiethoxysilane, vinyltris(2-methoxy-ethoxy) silane, γ-(meth)acryloyloxypropyltrimethoxysilane, γ-(meth)acryloyloxypropylmethyldimethoxysilane, vinyltriacetoxysilane, γ-(meth)acryloyloxyethyltrimethoxysilane, γ-(meth)acryloyloxypropyltriethoxysilane, γ-(meth)acryloyloxypropylmethyldiethoxysilane and the like. In view of low-temperature curability and storage stability, vinyl monomers containing an ethoxysilyl group as hydrolyzable alkoxysilyl group, such as vinyltriethoxysilane, vinylmethyldiethoxysilane, γ-(meth) acryloyloxypropyltriethoxysilane, γ-(meth) acryloyloxypropylmethyldimethoxysilane and the like are preferable. The hydroxyl-containing vinyl monomers and other vinyl monomers mentioned above are used in the preparation of the polymer (B).

The epoxy-containing vinyl monomer, hydroxyl-containing vinyl monomer, hydrolyzable alkoxysilyl group-containing vinyl monomer and other vinyl monomer are copolymerized in the following proportions based on the total weight of the monomers. The proportion of the epoxy-containing vinyl monomer is about 5 to about 60% by weight, preferably about 10 to about 40% by weight, in view of curability and storage stability. The proportion of the hydroxyl-containing vinyl monomer is about 3 to about 50% by weight, preferably about 5 to about 30% by weight, in view of curability and storage stability. The proportion of the hydrolyzable alkoxysilyl group-containing vinyl monomer is about 3 to about 40% by weight, preferably about 5 to about 20% by weight, in view of curability and costs. The proportion of the other vinyl monomer is about 10 to about 80% by weight, preferably about 20 to about 50% by weight. Of the other vinyl monomers, styrene is used suitably in a proportion of up to about 20% by weight in view of weatherability of the cured coating.

The polymer (B) prepared by the copolymerization of the monomers in said proportion range has an epoxy content of 0.5 to 5.0 mmol/g, preferably 0.8 to 2.5 mmol/g, a hydroxyl value of 10 to 200 mg KOH/g, preferably 30 to 120 mg KOH/g, and a hydrolyzable alkoxysilyl group content of 0.3 to 5.0 mmol/g, preferably 1.0 to 3.0 mmol/g.

An epoxy content of less than 0.5 mmol/g in the polymer (B) is likely to lower the curability of the resulting composition and to thereby reduce the acid resistance and scratch resistance of the coating film, whereas an epoxy content of more than 5.0 mmol/g tends to decrease the compatibility with the compound (A) and the reactive organopolysiloxane (C) and to thereby reduce the storage stability of the composition. Hence an epoxy content of the polymer (B) outside said range is undesirable.

A hydroxyl value of less than 10 mg KOH/g in the polymer (B) is likely to lower the curability of the resulting composition and to thereby reduce the acid resistance and scratch resistance of the coating film, whereas a hydroxyl value of more than 200 mg KOH/g in the polymer (B) tends to decrease the water resistance of the film. Hence a hydroxyl value of the polymer (B) outside said range is undesirable.

A hydrolyzable alkoxysilyl group content of 0.3 mmol/g in the polymer (B) is likely to lower the curability of the resulting composition, to thereby reduce the acid resistance and scratch resistance of the coating film, whereas a hydrolyzable alkoxysilyl group content exceeding 5.0 mmol/g results in high costs. Hence a hydrolyzable alkoxysilyl group content of the polymer (B) outside said range is undesirable.

Preferably the polymer (B) is an acrylic polymer having a number average molecular weight of 2,000 to 10,000. A number average molecular weight of less than 2,000 tends to impair the weatherability of the cured coating, whereas a number average molecular weight exceeding 10,000 tends to reduce the compatibility with the compound (A) and the reactive organopolysiloxane (C). Hence a number average molecular weight of the polymer (B) outside said range is undesirable.

The reactive organopolysiloxane (C) for use in the present invention is a compound having a reactive functional group and an organo group at the side chain and/or the end of the polysiloxane chain. Said reactive organopolysiloxane is used to impart a high resistance to acids and scratching to the coating film, and is not limited specifically insofar as it has compatibility with the compound (A) and the polymer (B).

The reactive organopolysiloxane (C) may have linear, branched, reticulate, cyclic or like structure.

Examples of the organo group (organic group) mentioned above are alkyl (methyl, ethyl, propyl, butyl, hexyl, etc.), alkenyl, aryl, allyl, phenyl, etc. In particular, compounds having an organo group such as methyl, vinyl, phenyl, etc. are practically advantageous in view of costs.

Examples of the reactive functional group mentioned above are silanol, alkoxysilyl, alcoholic hydroxyl group, glycidyl, amino, mercapto, carboxyl, amide, vinyl, (meth) acryloxy and like groups. Among them, alkoxysilyl group, alcoholic hydroxyl group and glycidyl group are especially preferable.

The molecular weight of the component (C) can be suitably selected insofar as said component is compatible with the components (A) and (B), and thus can not be specified in general. However, it is usually suitable that the component (C) have a number average molecular weight of about 100 to 10,000, preferably 300 to 5,000. If the molecular weight increases beyond the above range, the compatibility of the component (C) with the components (A) and (B) tends to reduce.

The component (C) has preferably 2 to 300, more preferably 2 to 100, most preferably 3 to 50 silicon atoms in one molecule.

The component (C) is a known compound. Specific examples are those disclosed in Japanese Unexamined Patent Publications No. 43,696/1993 and No. 70,509/1995. These compounds can be used singly or as a mixture of two or more.

The crosslinked particulate polymer (D) is an internally crosslinked particulate polymer which is incompatible with the carboxyl-containing compound (A), the vinyl polymer (B) having an epoxy group, a hydroxyl group and a hydrolyzable alkoxysilyl group in one molecule, the reactive organopolysiloxane (C) and solvents, and can be dispersed stably. The component (D) is used to impart thixotropic properties to the mixture of the components (A), (B) and (C) which form the coating composition.

Stated specifically, since said mixture substantially has Newtonian flow properties, the coating film formed therefrom has various defects such as sagging, cissing, etc., caused by the application of the mixture to a perpendicular substrate or by the temperature increase in the baking process subsequent to the application. Contrastingly, if the crosslinked particulate polymer (D) is added to the above mixture, the obtained mixture has a high apparent viscosity when left to stand, but shows a satisfactorily low viscosity when a high shear stress is applied, as in a spray coating process. Accordingly, the mixture is amenable to spray coating without causing sagging, and exhibits thixotropic effects in few seconds or few minutes after application to the substrate, satisfactorily inhibiting the film defects such as cissing.

Useful examples of the crosslinked particulate polymer (D) are known fine particulate polymers crosslinked in the molecule, which is obtained by an aqueous emulsion or aqueous suspension polymerization method or by a nonaqueous dispersion polymerization method. Among them, particulate polymers having intramolecularly crosslinked structure obtained by the aqueous emulsion or aqueous suspension polymerization method can be separated in the form of a solid by physical or chemical methods such as evaporation or azeotropic distillation of water, precipitation or aggregation of the polymer (particles), etc. Alternatively, said physical or chemical methods may be carried out using other resins, organic solvents and the like in place of water, as the medium for the objective crosslinked particulate polymer.

According to the present invention, preferably usable as the crosslinked particulate polymer (D) are crosslinked fine particulate polymers as disclosed in Japanese Unexamined Patent publication No. 66,770/1991 which is obtained by subjecting a polymerizable monomer having at least two radically polymerizable unsaturated group in one molecule and other radically polymerizable unsaturated monomer to emulsion polymerization in the presence of a reactive emulsifier having allyl group in a molecule. In this case, the particulate polymer is intramolecularly crosslinked by the polymerizable monomer having at least two radically polymerizable unsaturated groups in the molecule.

Also usable as the crosslinked particulate polymer (D) are nonaqueous dispersions of particulate polymers as disclosed in Japanese Unexamined Patent Publication No. 95,116/1989 which is obtained by polymerizing a radically polymerizable unsaturated monomer in an organic liquid using, as a dispersion stabilizing resin a polymer containing an alkoxysilyl-containing vinyl monomer as an essential monomer component, said particulate polymer being insoluble in said organic liquid. In this case, the particulate polymer is intramolecularly crosslinked by the alkoxysilyl-containing polymerizable vinyl monomer. A polymerizable monomer having at least two radically polymerizable unsaturated groups in one molecule can be used in combination with the alkoxysilyl-containing vinyl monomer in order to further intramolecularly crosslink the particulate polymer.

The crosslinked particulate polymer as mentioned above has high crosslinking density, and substantially does not swell or melt even in solvents with high polymer-dissolving power, such as toluene, ethyl acetate and the like. Further, said particulate polymer, when added to a solution or dispersion of a binder resin containing said high-dissolving-power solvent, can give a solution or dispersion having a high resin content, i.e., a high solid content, without increasing the viscosity of the solution or dispersion. Moreover, when the composition containing said crosslinked particulate polymer is dried, the particulate polymer forms a cured film in combination with the binder resin.

It is suitable that the crosslinked particulate polymer (D) have an average particle diameter of about 0.01 to 2 μm, preferably 0.05 to 0.5 μm. An average particle diameter below said range tends to reduce the sagging inhibiting effect, whereas an average particle diameter beyond said range is likely to impair the finishing appearance. Thus, an average particle diameter outside said range is undesirable.

The composition of the invention contains, as essential components, the carboxyl-containing compound (A), the vinyl polymer (B) having an epoxy group, a hydroxyl group and a hydrolyzable alkoxysilyl group in one molecule, the reactive organopolysiloxane (C) and the crosslinked particulate polymer (D) preferably in the following proportions. The proportions of the compound (A) and the polymer (B) is such that the equivalent ratio of the carboxyl group in the compound (A) to the epoxy group in the polymer (B) is 1:0.5 to 0.5:1, the proportion of the reactive organopolysiloxane (C) is 3 to 50 parts by weight per 100 parts by weight of the compound (A) and the polymer (B) in total, and the proportion of the crosslinked particulate polymer (D) is 1 to 20 parts by weight per 100 parts by weight of the compound (A), the polymer (B) and the reactive organopolysiloxane (C) in total. Proportions outside said range tend to reduce the curability to thereby lower the acid resistance and scratch resistance of the coating film, and thus are not preferable.

More preferably, the proportions of the compound (A) and the polymer (B) are such that the equivalent ratio of the carboxyl group in the former to the epoxy group in the latter is 1:0.6 to 0.6 to 1, and the proportion of the reactive organopolysiloxane (C) is 5 to 30 parts by weight per 100 parts by weight of the compound (A) and the polymer (B) in total, and the proportion of the crosslinked particulate polymer (D) is 1 to 10 parts by weight per 100 parts by weight of the compound (A), the polymer (B) and the reactive organopolysiloxane (C) in total.

The curable coating composition of the present invention may contain curing catalysts when necessary. Usable curing catalysts include catalysts effective for the crosslinking reaction of the carboxyl group with the epoxy group, such as tetraethylammonium bromide, tetrabutylammonium bromide, tetraethylammonium chloride, tetrabutylphosphonium bromide, triphenylbenzylphosphonium chloride and like quaternary salt catalysts; triethylamine, tributylamine and like amines; etc. Among them, quaternary salt catalysts are preferable. Catalysts consisting of said quaternary salt and a phosphoric acid compound (e.g., monobutylphosphoric acid, dibutylphosphoric acid, etc.) in equivalent amounts are also preferable, since such catalysts improve the storage stability of the coating composition and prevent the lowering of the spray coating amenability owing to the reduction of the electric resistance of the coating composition, without impairing the above-mentioned catalytic action.

Also usable are catalysts effective for the crosslinking reaction of the ethoxysilyl group, such as dibutyltin dilaurate, dibutyltin diacetate and like tin catalysts; tetrabutyl titanate and like titanium catalysts; triethylamine, tributylamine and like amines; etc.

The above two types of catalysts can be used singly or as a mixture. In view of curability and scratch resistance, combined use is preferable.

When necessary, the curable coating composition of the present invention may contain dehydrating agents such as trimethyl orthoacetate for preventing the coating composition from degradation caused by moisture in the air or in the solvent.

Generally known pigments such as coloring pigments, extender pigments, anti-corrosive pigments and the like can be added to the coating composition of the present invention, when necessary.

Examples of useful coloring pigments are organic pigments such as quinacridone red and like quinacridone pigments, pigment red and like azo pigments, phthalocyanine blue, phthalocyanine green, perylene red and like phthalocyanine pigments, inorganic pigments such as titanium oxide and carbon black, metallic pigments such as aluminum flake, nickel flake, copper flake, brass flake, chrome flake, pearl mica and colored pearl mica.

Optionally the curable coating composition of the invention may contain resins such as polyester resins, alkyd resins, silicone resins, fluorine resins, etc., and may also contain a minor amount of melamine resins, blocked isocyanate or like crosslinking agent. Further, the curable composition of the invention may contain conventional additives for coating compositions such as UV absorbers, oxidation inhibitors, surface modifiers, defoaming agents, etc.

The curable coating composition of the invention is usually used in the form of an organic solvent type coating composition. Examples of useful organic solvents include those for coating compositions such as aromatic or aliphatic hydrocarbon solvents, alcohol solvents, ester solvents, ketone solvents, ether solvents, etc. Organic solvents used in preparing the polymers as the components of the composition can be used as it is, or additional organic solvents may be used. The solid concentration of the composition is as high as about 40 to about 80% by weight, preferably about 50 to about 75% by weight.

The curable coating composition of the invention can be applied to various substrates by conventional coating methods and can be fully cured by heating at a temperature of about 100° to about 180° C. for about 10 to about 60 minutes to give a coating film having high resistance to acids and scratching.

The method for forming a topcoat according to the present invention comprises the step of successively forming a colored base coat and clear topcoat on a substrate, said base coat and/or clear topcoat being formed from the curable coating composition of the invention.

The substrates to be used for forming the topcoat include steel panels treated by chemical conversion, electrophoretically coated with a primer, and optionally coated with an intercoat; various plastic substrates optionally surface-treated and optionally coated either with a primer or with a primer and an intercoat; substrates produced by a composite of the steel and plastics, etc.

In the method of forming a topcoat according to the invention, the curable coating composition of the invention is used as at least one of the composition for forming the colored base coat and the composition for forming the clear topcoat.

The curable coating composition of the invention is capable of forming a coating film excellent especially in resistance to acids and scratching and is, therefore, preferably used as a composition for forming a clear topcoat.

The curable coating composition of the invention as such can be used as a clear topcoat composition. The clear topcoat composition may contain coloring pigments in an amount which will not completely hide the colored base coat.

The curable coating composition of the invention can be used as a colored base coat composition by properly incorporating therein the organic pigments, inorganic pigments, metallic pigments and like coloring pigments mentioned above.

The method of forming a topcoat according to the invention is particularly suitable for forming a topcoat on automotive exterior panels. The coating methods of the invention include those known in the automotive industry, for example, those comprising forming a colored base coat and a clear topcoat by 2-coat 1-bake system or 2-coat 2-bake system, and those comprising forming a colored base coat, a clear topcoat and a clear topcoat by 3-coat 1-bake system or 3-coat 2-bake system.

The most desirable method of forming a topcoat according to the invention comprises the steps of applying a composition for forming a colored base coat to a substrate, applying a composition for forming a clear topcoat to the uncured surface of the base coat, and curing the two coats by heating according to 2-coat 1-bake system.

Described below is the coating method by 2-coat 1-bake system using the curable coating composition of the invention as a clear topcoat composition.

In 2-coat 1-bake system, a colored base coat composition is first applied to the above mentioned substrate by conventional coating methods such as spray coating or the like.

The colored base coat composition may be of the type comprising the curable coating composition of the invention and coloring pigments, or may be of the type per se known and conventionally used in a method for forming a topcoat.

Examples of colored base coat compositions per se known include, for example, those comprising a curable resin component and said coloring pigment, Useful curable resin components are, for example, acrylic resin/amino resin mixture, alkyd resin/amino resin mixture, polyester resin/amino resin mixture, acrylic resin/polyisocyanate mixture, alkyd resin/polyisocyanate mixture, polyester resin/polyisocyanate mixture, etc. The amino resins used in said mixtures include melamine resins. The form of these known colored base coat compositions is not specifically limited and can be a desirable type selected from organic solvent type, nonaqueous dispersion type, aqueous dispersion type, aqueous solution type, high solid type, etc.

Application devices for spray coating include those conventionally used, such as an air spray gun, airless spray gun, air spray type electrostatic coater, airless spray type electrostatic coater, rotary atomization type electrostatic coater, etc.

The colored base coat composition is applied preferably to a thickness of about 10 to about 30 μm (when cured). The colored base coat thus deposited is left to stand at room temperature for a few minutes or is force-dried at a temperature of about 50° to about 80° C. for a few minutes and then the curable coating composition of the invention is applied as a clear topcoat composition.

The clear topcoat composition is applied by the same methods using the same coaters as used in the application of the colored base coat composition.

The clear topcoat composition is applied preferably to a thickness of about 20 to about 80 μm (when cured).

Both the colored base coat and the clear topcoat thus applied are concurrently cured by heating at about 100° to about 180° C. for about 10 to about 60 minutes.

In the method for forming a topcoat according to the present invention, the composition for forming the colored base coat is preferably an aqueous type, or an organic solvent type having a solid concentration of about 30 to about 50% by volume (when applied by spray coating), which usually corresponds to about 35 to about 65% by weight. The composition for forming the clear topcoat is preferably of an organic solvent type having a solid concentration of about 35 to 60% by volume (when applied by spray coating), which usually corresponds to about 45 to about 75% by weight.

The articles coated by the coating method of the invention have a coating film excellent in resistance to acids and scratching, and the coating film thus formed is particularly suitable for covering automotive exterior panels.

The present invention is described below in more detail with reference to Preparation Examples, Comparative Preparation Examples, Examples and Comparative Examples wherein the parts and percentages are all by weight.

PREPARATION EXAMPLE 1

Preparation of Half Ester (a-1) Formed by Addition Reaction of Polyol with 1,2-Acid Anhydride A 5-liter glass flask equipped with a stirrer, thermometer and condenser was charged with 236 parts of 3-methyl-1,5-pentanediol, 134 parts of trimethylol-propane, 1078 parts of hexahydrophthalic anhydride and 780 parts of xylene. The mixture was heated to 120° C. in a nitrogen atmosphere to initiate a reaction. The reaction mixture was maintained at the same temperature for 4 hours and then cooled, giving a half ester (a-1) of a solid content of 65%, a Gardner viscosity (25° C.) of R and an acid value of 271 mg KOH/g.

PREPARATION EXAMPLE 2

Preparation of Vinyl Polymer (a-2) Having Half Ester Group

A 5-liter glass flask equipped with a stirrer, thermometer and condenser was charged with 553 parts of xylene and 276 parts of 3-methoxybutyl acetate. The mixture was heated to 125° C. by an electrothermic mantle. At the same temperature, a mixture of the following monomer components was added dropwise at a uniform rate over a period of 4 hours. p-Tert-butylperoxy-2-ethyl hexanoate is a polymerization initiator.

| Methanol half ester of maleic anhydride | 288 parts (20%) |
| 4-Hydroxy-n-butyl acrylate | 288 parts (20%) |
| n-Butyl acrylate | 576 parts (40%) |
| Styrene | 288 parts (20%) |
| p-Tert-butylperoxy-2-ethyl hexanoate | 72 parts |

The mixture was aged for 30 minutes. Added dropwise was a mixture of 277 parts of 3-methoxybutyl acetate and 14.4 parts of p-tert-butylperoxy-2-ethyl hexanoate over a period of 2 hours. The mixture was aged for 2 hours, giving a solution of an acrylic polymer (a-2) of a final conversion of 98%.

The obtained polymer solution had a polymer solid content of 55% and a Gardner viscosity (25° C.) of M. The polymer had a number average molecular weight of 3,500 and an acid value of 86 mg KOH/g.

PREPARATION EXAMPLE 3

Preparation of Vinyl Polymer (b-1) Having Epoxy Group, Hydroxyl Group and Hydrolyzable Alkoxysilyl Group A 5-liter glass flask equipped with a stirrer, thermometer and condenser was charged with 410 parts of xylene and 77 parts of n-butanol. The mixture was heated to 125° C. by an electrothermic mantle. At the same temperature, a mixture of the following monomer components was added dropwise at a uniform rate over a period of 4 hours. Azobisisobutyronitrile is a polymerization initiator.

| Glycidyl methacrylate | 504 parts (35%) |
| 4-Hydroxy-n-butyl acrylate | 216 parts (15%) |
| γ-methacryloxypropyltriethoxysilane | 216 parts (15%) |
| n-Butyl acrylate | 216 parts (15%) |
| Styrene | 288 parts (20%) |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of an acrylic polymer (b-1) of a final conversion of 100%.

The obtained polymer solution had a polymer solid content of 70% and a Gardner viscosity (25° C.) of V. The polymer had a number average molecular weight of 2,000, an epoxy content of 2.12 mmol/g, a hydroxyl value of 78 mg KOH/g and an ethoxysilyl content of 1.55 mmol/g.

COMPARATIVE PREPARATION EXAMPLE 1

Preparation of Vinyl Polymer (b-2) Having Epoxy Group and Hydroxyl Group

A solution of an acrylic polymer (b-2) of a final conversion of 100% was prepared in the same manner as in Preparation Example 3 with the exception of changing only the monomer composition as follows.

| Glycidyl methacrylate | 432 parts (30%) |
| 4-Hydroxy-n-butyl acrylate | 288 parts (20%) |
| n-Butyl acrylate | 432 parts (30%) |
| Styrene | 288 parts (20%) |

The obtained polymer solution had a polymer solid content of 70% and a Gardner viscosity (25° C.) of U. The polymer had a number average molecular weight of 2,000, an epoxy content of 2.12 mmol/g, a hydroxyl value of 78 mg KOH/g and an alkoxysilyl content of 0 mmol/g.

COMPARATIVE PREPARATION EXAMPLE 2

Preparation of Vinyl Polymer (b-3) Having Epoxy Group

A solution of an acrylic polymer (b-3) of a final conversion of 100% was prepared in the same manner as in Preparation Example 3 with the exception of changing only the monomer composition as follows.

| Glydicyl methacrylate | 432 parts (30%) |
| n-Butyl acrylate | 720 parts (50%) |
| Styrene | 288 parts (20%) |

The obtained polymer solution had a polymer solid content of 70% and a Gardner viscosity (25° C.) of S. The polymer had a number average molecular weight of 2,000, an epoxy content of 2.12 mmol/g and a hydroxyl value of 0 mg KOH/g and an alkoxysilyl content of 0 mmol/g.

PREPARATION EXAMPLE 4

Preparation of Crosslinked Particulate Polymer (d-1)

A 1-liter flask equipped with a stirrer, thermometer, condenser and heating mantle was charged with 3547.5 parts of deionized water and 20 parts of 50% "RATEMURU S-120A" (tradename, product of Kao Corp., sulfosuccinic acid type allyl-containing anionic reactive emulsifier), and the mixture was heated to 90° C. with stirring. To the mixture was added 20% of an aqueous solution of 12.5 parts of a water-soluble azoamide polymerization initiator "VA-086" (tradename, product of Wako Pure Chemical Ind., 2,2'-azobis[2-methyl-N-(2-hydroxyethyl)propionamide]) in 500 parts of deionized water. After 15 minutes, 5% of a monomer mixture consisting of 150 parts of styrene, 550 parts of methyl methacrylate, 150 parts of n-butyl acrylate and 50 parts of 2-hydroxyethyl acrylate and 100 parts of 1,6-hexanediol diacrylate was added. The resulting mixture was further stirred for 30 minutes, and then dropwise addition of the remaining monomer mixture and polymerization initiator was started. The monomer mixture was added over a period of 3 hours, and the polymerization initiator over a period of 3.5 hours. During the addition, the polymerization temperature was maintained at 90° C. After completion of the addition of the aqueous solution of the polymerization initiator, the mixture was heated for 30 minutes to maintain the temperature at 90° C. and then cooled to the room temperature. Subsequently, the mixture was filtered through a cloth filter, giving a 20% aqueous dispersion of a crosslinked particulate polymer having a solid content of 20%.

The obtained aqueous dispersion was placed into a stainless steel vat and dried at 60° C. in an electric hot-air drier to obtain a solid resin. Thereafter, the resin was dispersed in a solvent mixture consisting of xylene and n-butyl alcohol in a weight ratio of 50/50 which had been heated to 60° C., giving a dispersion of a crosslinked particulate polymer (d-1) having a solid concentration of 15%.

The obtained dispersion had a Gardner viscosity (25° C.) of A2, and the particulate polymer had an average particle diameter of 70 nm (as measured with "Nanosizer N-4", a product of Coulter Co., Ltd.).

PREPARATION EXAMPLE 5

Preparation of Crosslinked Particulate Polymer (d-2)
(1) Preparation of Dispersion Stabilizing Resin One hundred parts of xylene was heated to 120° C., and the following monomers and polymerization initiator were added dropwise over a period of 3 hours. After completion of the dropwise addition, the resulting mixture was aged for 2 hours.

| | |
|---|---|
| γ-Methacryloxypropyltrimethoxysilane | 5 parts |
| Styrene | 10 parts |
| n-Butyl methacrylate | 35 parts |
| 2-Ethylhexyl methacrylate | 25 parts |
| Lauryl methacrylate | 25 parts |
| 2,2'-Azobisisobutyronitrile | 4 parts |

The obtained acrylic resin (dispersion stabilizing resin) varnish had a nonvolatile content of 50%, a Gardner viscosity (25° C.) of B and a weight average molecular weight of about 10,000.

(2) Preparation of Nonaqueous Dispersion of Crosslinked Particulate Polymer

| | |
|---|---|
| Heptane | 100 parts |
| The dispersion stabilizing resin varnish obtained above | 83 parts |

The above components were placed into a flask and refluxed by heating. The following monomers and polymerization initiator were added dropwise over a period of 3 hours, and the mixture was aged for 2 hours, giving a dispersion of a crosslinked particulate polymer (d-2) having a solid concentration of 50%.

| | |
|---|---|
| γ-Methacryloxypropyltrimethoxysilane | 20 parts |
| Styrene | 15 parts |
| Acrylonitrile | 15 parts |
| Methyl methacrylate | 50 parts |
| 2,2'-Azobisisobutyronitrile | 2 parts |

The obtained dispersion had a Gardner viscosity (25° C.) of A1. The particulate polymer had an average particle diameter of 300 nm (as measured with "Nanosizer N-4", product of Coulter Co., Ltd.).

PREPARATION EXAMPLE 6

Preparation of Organic Solvent Type Colored Base Coat Composition (Y-1)

A mixture of the following components was adjusted to a viscosity of 16 seconds (Fordcup #4/20° C.) with a solvent mixture consisting of 30 parts of toluene, 20 parts of isobutyl alcohol, 30 parts of cellosolve acetate and 20 parts of "SWASOL 1000" (tradename, product of Cosmo Oil Co., Ltd., hydrocarbon solvent), giving an organic solvent type coating composition (Y-1). The composition had a solid concentration of 35% by volume (when applied).

| | |
|---|---|
| 70% Acrylic resin (*1) | 57 parts |
| 70% Half ester compound (*2) | 43 parts |
| 80% "CYMEL 202" (*3) | 38 parts |
| Aluminum paste (*4) | 20 parts |
| Xylene | 30 parts |

(*1) 70% acrylic resin: an acrylic resin having a number average molecular weight of 5,000 and a resin content of 70% which is prepared by polymerizing 45 parts of n-butyl methacrylate, 35 parts of glycidyl methacrylate and 20 parts of 2-hydroxyethyl acrylate in xylene
(*2) 70% half ester compound: a compound having a molecular weight of 446, an acid value of 252 mg KOH/g, a hydroxyl value of 126 mg KOH/g and a solid content of 70% which is prepared by subjecting 1 mole of trimethylol propane and 2 moles of hexahydrophthalic anhydride to half esterification in xylene
(*3) 80% "CYMEL 202": tradename, product of Mitsui Cytec Ltd., a melamine resin having a resin solid content of 80%
(*4) Aluminum paste: product of Toyo Aluminum Co., Ltd., tradename "ALPASTE 1830YL", aluminum flake paste, metallic pigment

PREPARATION EXAMPLE 7

Preparation of an Aqueous Colored Base Coat Composition (M-1)

(1) Preparation of an Aqueous Dispersion of Acrylic Resin (W-1)

A reactor was charged with 140 parts of deionized water, 2.5 parts of 30% "NEWCOL 707SF" (tradename, product of Nihon Nyukazai Co., Ltd., surfactant) and 1 part of the monomer mixture (1) shown below. The mixture was stirred in a nitrogen stream. An emulsion consisting of 4 parts of 3% ammonium persulfate and 42 parts of deionized water was placed dropwise into the reactor over a period of 4 hours using a metering pump. After the addition, the mixture was aged for 1 hour.

| Monomer mixture (1) | |
|---|---|
| Methyl methacrylate | 55 parts |
| Styrene | 10 parts |

| Monomer mixture (1) | |
|---|---|
| n-Butyl acrylate | 9 parts |
| 2-Hydroxyethyl acrylate | 5 parts |
| Methacrylic acid | 1 part |

Then, 20.5 parts of the monomer mixture (2) shown below and 4 parts of 3% ammonium persulfate were concurrently placed dropwise into the reactor over a period of 1.5 hours. After the addition, the mixture was aged for 1 hour and filtered at 30° C. through a 200-mesh nylon cloth filter. Deionized water was added, and the mixture was adjusted to pH 7.5 with dimethylaminoethanol, giving an aqueous dispersion of acrylic resin (W-1) having an average particle diameter of 0.1 μm, a glass transition temperature (Tg) of 46° C. and a nonvolatile content of 20%.

| Monomer mixture (2) | |
|---|---|
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

(2) Preparation of an Aqueous Solution of Acrylic Resin (W-2)

A reactor was charged with 60 parts of butyl cellosolve and 15 parts of isobutyl alcohol. The mixture was heated to 115° C. in a nitrogen stream. At a temperature of 115° C., there was added a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile over a period of 3 hours. After the addition, the mixture was aged at 115° C. for 30 minutes. A mixture of 1 part of azobisisobutyronitrile and 115 parts of butyl cellosolve was added dropwise over a period of 1 hour, followed by aging for 30 minutes. The mixture was filtered at 50° C. through a 200-mesh nylon cloth filter. The obtained reaction product had an acid value of 48 mg KOH/g, a viscosity (Gardner bubble viscometer) of Z4, a nonvolatile content of 55% and a Tg of 45° C. The product was subjected to equivalent neutralization using dimethylaminoethanol. Then deionized water was added, giving an aqueous solution of acrylic resin (W-2) having a nonvolatile content of 50%.

(3) Preparation of an Aqueous Colored Base Coat Composition (M-1)

| | |
|---|---|
| Aqueous dispersion of acrylic resin (W-1) | 275 parts |
| Aqueous solution of acrylic resin (W-2) | 40 parts |
| "CYMEL 350" (tradename, product of Mitsui Toatsu Chemicals Inc., melamine resin) | 25 parts |
| "ALUMINUM PASTE AW-500B" (tradename, product of Asahi Chemical Metals Co., Ltd., metallic pigment) | 20 parts |
| Butyl cellosolve | 20 parts |
| Deionized water | 253 parts |

"THIXOL K-130B" (tradename, product of Kyoeisha Yushi Kagaku Kogyo KK, thickener) was added to the mixture of the above components to adjust the mixture to a viscosity of 3,000 cps as measured with a Brookfield viscometer (rotor revolution speed 6 rpm), giving an aqueous metallic coating composition (M-1) having a nonvolatile content of about 19%.

EXAMPLES 1–4 AND COMPARATIVE EXAMPLES 1–4

A solution of mixed resins having the composition (on solid basis) shown in Table 1 was prepared. Added were 2 parts of a mixture of tetrabutylammonium bromide and monobutylphosphoric acid in equivalent amount, 1 part of "TINUVIN 900" (tradename, product of Ciba-Geigy, ultraviolet absorber) and 0.1 part of "BYK-300" (tradename, product of BYK-Chemie Co., surface modifier). The mixture was diluted with "SWASOL 1000" (tradename, product of Cosmo Oil Co., Ltd., hydrocarbon solvent) for adjustment to a viscosity of 25 seconds (Ford cup #4/20° C.), whereby the coating composition of the present invention or a comparative coating composition was prepared. Table 1 shows the nonvolatile content of the obtained coating compositions (when applied).

The compositions thus obtained were tested for storage stability by the following method.

Storage stability: Each composition was diluted with "SWASOL 1000" to a viscosity of 30 seconds (Ford cup #4/20° C.). A 300 g portion of the diluted composition was placed into a beaker which was then loosely covered with aluminum foil. The composition was stored at 40° C. for 2 weeks, and its viscosity (Ford cup #4/20° C.) was measured to check the degree of thickening. The results were evaluated by the following criteria:

A; viscosity not more than 50 seconds (good storage stability), B; viscosity not more than 70 seconds (slightly lower storage stability), and C; viscosity more than 70 seconds (poor storage stability).

The results are shown in Table 1.

TABLE 1

| | Example | | | | Comparative Example | | | |
|---|---|---|---|---|---|---|---|---|
| Component | 1 | 2 | 3 | 4 | 1 | 2 | 3 | 4 |
| Compound (A) | | | | | | | | |
| a-1 | 30 | | 30 | 30 | 30 | 30 | 33 | 30 |
| a-2 | | 50 | | | | | | |
| Polymer (B) | | | | | | | | |
| b-1 | 60 | 40 | 60 | 60 | | | 67 | 60 |
| b-2 (for comparison) | | | | | 60 | | | |
| b-3 (for comparison) | | | | | | 60 | | |
| Reactive organopolysiloxane (C) | | | | | | | | |
| "X41-1067" | 10 | 10 | | 10 | 10 | 10 | | 10 |
| "AZ-6180" | | | 10 | | | | | |
| Crosslinked particulate polymer (D) | | | | | | | | |
| d-1 | 3 | 3 | 3 | | 3 | 3 | 3 | |
| d-2 | | | | 3 | | | | |
| Nonvolatile content when applied (% by volume) | 53 | 49 | 54 | 54 | 47 | 45 | 45 | 53 |
| Storage stability | A | A | A | A | A | A | A | A |

The reactive organopolysiloxanes (C) shown in Table 1 are as follows.

"X41-1067": tradename, product of Shinetsu Kagaku KK, a glycidyl- and methoxysilyl-containing organopolysiloxane having a molecular weight of 740 and represented by the following formula.

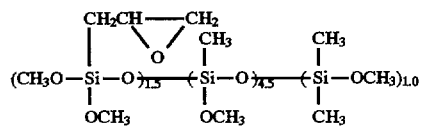

"AZ-6180": tradename, product of Nihon Unicar KK, methoxysilyl- and alcoholic hydroxyl group-containing organopolysiloxane having a molecular weight of 1017 and represented by the following formula

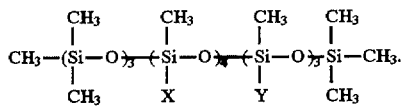

X: $-C_2H_4-Si-(OCH_3)_3$
Y: $-(CH_2)_3-O-(C_2H_4O)_3-(CH_3H_6O)_3-H$

In Table 1, the ratio of the compound (A) to the polymer (B) (calculated in terms of an equivalent ratio of the carboxyl group in the former to the epoxy group in the latter) was 1:0.88 in Example 1, 1:1.11 in Example 2, 1:0.88 in Example 3, 1:0.88 in Example 4, 1:0.88 in Comparative Example 1, 1:0.88 in Comparative Example 2, 1:0.88 in Comparative Example 3, and 1:0.88 in Comparative Example 4. The proportion of the reactive organopolysiloxane (C) was, per 100 parts of the compound (A) and the polymer (B) in total, 11.1 parts in Example 1, 11.1 parts in Example 2, 11.1 parts in Example 3, 11.1 parts in Example 4, 11.1 parts in Comparative Example 1, 11.1 parts in Comparative Example 2, 0 part in Comparative Example 3 and 11.1 parts in Comparative Example 4. The proportion of the crosslinked particulate polymer (D) was, per 100 parts by weight of the compound (A), the polymer (B) and the reactive organopolysiloxane (C) in total, 3 parts in Example 1, 3 parts in Example 2, 3 parts in Example 3, 3 parts in Example 4, 3 parts in Comparative Example 1, 3 parts in Comparative Example 2, 3 parts in Comparative Example 3 and 0 part in Comparative Example 4.

EXAMPLES 5 TO 12 AND COMPARATIVE EXAMPLES 5 to 12

Topcoats were formed by the following method according to 2-coat 1-bake system using the coating compositions obtained in Examples 1 to 4 and Comparative Examples 1 to 4 as clear topcoat compositions.

A dull steel panel of 0.8 mm thickness treated by chemical conversion with zinc phosphate was coated with an epoxy-based cationic electrodepositable coating composition to give a coating film of about 20 μm thickness (when dried). The coated panel was baked at 170° C. for 20 minutes, polished with sand paper (#400), and degreased by wiping with petroleum benzine. The coated panel was further coated by air spray coating with an automotive intercoating surfacer to give a coating film of about 25 μm thickness (when dried). The coated panel was baked at 140° C. for 30 minutes, subjected to wet rubbing with sand paper (#400), dehydrated for drying, and degreased by wiping with petroleum benzine, giving a test substrate.

The colored (metallic) base coat compositions obtained in Preparation Examples 6 and 7 were applied to the test substrate to a thickness of 20 μm (when cured). The coated substrate was left to stand at room temperature for 5 minutes in the case of application of the coating composition (Y-1) and was force-dried at 80° C. for 10 minutes in the case of application of the coating composition (M-1). Each clear topcoat composition prepared above was applied to the coated test substrate to give a coating film of 40 μm thickness (when cured). The coated panel was heated at 140° C. for 30 minutes, whereby the two coats were cured to form a topcoat.

The clear topcoat compositions were tested for coating amenability as follows.

Maximum foaming-free film thickness: The maximum film thickness (μm) in which the coating film has no foaming when formed on a static perpendicular surface Maximum sagging-free film thickness: The maximum film thickness (μm) in which the coating film has no sagging when formed on a static perpendicular surface The topcoats thus formed were tested for properties as follows.

Film Appearance

The metallic effect (brilliancy, whiteness and the like) was visually evaluated on A to C scale: A; excellent in metallic effect, B; poor in metallic effect, and C; exceedingly poor in metallic effect.

Acid Resistance

A half area of the coated panel was immersed in a 40% solution of sulfuric acid. Then, the coated panel was left to stand at 50° C. for 5 hours, followed by washing with water. The surface of coated panel was visually inspected and rated on A to C scale:

A; no change, B; substantially no change in the coating surface but a slight difference in film thickness between the immersed portion and unimmersed portion, and C; blushing on the coating surface.

Scratch Resistance

An automobile with a coated panel attached to the roof was washed 15 times in a car washer and the surface of coated panel was visually inspected. The car washer was a product of Yasui Sangyo Co., Ltd. available under the tradename "PO 20F WRC" and the coating surface was visually inspected. The results were evaluated on A to C scale:

A; substantially no scratch mark was found, B; slight scratch marks were found but to a negligible extent, and C; noticeable scratch marks were found.

Impact Resistance

The coated panel was tested with a Du Pont impact tester using a weight of 500 g with a tip 0.5 inch in radius. The results were rated in terms of the maximum height (5 cm calibration) at which no cracking was caused by the weight dropped onto the coated panel.

Water Resistance

The coated panel was dipped in warm water maintained at 40° C. for 240 hours and washed with water, followed by visual inspection of the coating surface. The evaluation was made on A to C scale:

A; no change, B; slight dulling on the coating surface, and C; blushing on the coating surface.

Recoat Adhesion

The applied base coat composition and clear coat composition were baked at 140° C. for 30 minutes to make a first topcoat. Then the same base coat composition and clear coat composition were applied in the same manner to the coated panel. Thereafter the coated panel was baked at 120° C. for 30 minutes to make a second topcoat. The coated panel was cut crosswise to reach the substrate, giving 100 squares with a spacing of 1 mm. A cellophane tape was applied to and then peeled from the cut surface. The adhesion between the first and the second topcoats was rated on A to C scale:

A; no peeling, B; slightly peeled and C; considerably peeled.

The results are shown in Table 2.

TABLE 2

| | Example | | | | | | | |
|---|---|---|---|---|---|---|---|---|
| | 5 | 6 | 7 | 8 | 9 | 10 | 11 | 12 |
| Base coat composition | Y-1 | Y-1 | Y-1 | Y-1 | M-1 | M-1 | M-1 | M-1 |
| Clear coat composition | Ex. 1 | Ex. 2 | Ex. 3 | Ex. 4 | Ex. 1 | Ex. 2 | Ex. 3 | Ex. 4 |
| Film properties | | | | | | | | |
| Maximum foaming-free film thickness (μm) | 55 | 58 | 56 | 56 | 57 | 60 | 59 | 60 |
| Maximum sagging-free film thickness (μm) | 50 | 48 | 49 | 52 | 52 | 51 | 53 | 54 |
| Film appearance | A | A | A | A | A | A | A | A |
| Acid resistance | A | A | A | A | A | A | A | A |
| Scratch resistance | A | A | A | A | A | A | A | A |
| Impact resistance | 50 | 50 | 50 | 50 | 50 | 50 | 50 | 50 |
| Water resistance | A | A | A | A | A | A | A | A |
| Recoat adhesion | A | A | A | A | A | A | A | A |

| | Comparative Example | | | | | | | |
|---|---|---|---|---|---|---|---|---|
| | 5 | 6 | 7 | 8 | 9 | 10 | 11 | 12 |
| Base coat composition | Y-1 | Y-1 | Y-1 | Y-1 | M-1 | M-1 | M-1 | M-1 |
| Clear coat composition | Comp. Ex. 1 | Comp. Ex. 2 | Comp. Ex. 3 | Comp. Ex. 4 | Comp. Ex. 1 | Comp. Ex. 2 | Comp. Ex. 3 | Comp. Ex. 4 |
| Film properties | | | | | | | | |
| Maximum foaming-free film thickness (μm) | 56 | 57 | 56 | 60 | 58 | 59 | 59 | 62 |
| Maximum sagging-free film thickness (μm) | 45 | 44 | 45 | 35 | 46 | 46 | 46 | 37 |
| Film appearance | B | C | C | A | B | C | C | A |
| Acid resistance | A | B | C | A | A | B | C | A |
| Scratch resistance | C | C | B | A | C | C | B | A |
| Impact resistance | 30 | 30 | 30 | 40 | 30 | 30 | 30 | 40 |
| Water resistance | B | C | B | A | B | C | B | A |
| Recoat adhesion | B | C | B | A | B | C | B | A |

According to the invention, there is provided a novel heat-curable high solid coating composition which can form a coating film excellent in resistance to acids and scratching, and which is superior in low temperature curability, storage stability and recoat adhesion. Further provided is a method of forming a topcoat using said composition.

We claim:

1. A heat-curable high solid coating composition comprising:

(A) a carboxyl-containing compound, (B) a vinyl polymer having an epoxy group, a hydroxyl group and a hydrolyzable alkoxysilyl group in one molecule, (C) a reactive organopolysiloxane having at least one reactive functional group selected from the group consisting of an alkoxysilyl group, an alcoholic hydroxyl group and a glycidyl group, and (D) a crosslinked particulate polymer.

2. The composition according to claim 1 which is of an organic solvent type and has a solid concentration of about 40 to about 80% by weight.

3. The composition according to claim 1 wherein the compound (A) has an acid value of 50 to 500 mg KOH/g.

4. The composition according to claim 1 wherein the compound (A) is a vinyl polymer having in a molecule a group formed by half esterification of an acid anhydride group, and/or a half ester formed by addition reaction of a polyol with 1,2-acid anhydride.

5. The composition according to claim 1 wherein the hydrolyzable alkoxysilyl group in the polymer (B) is an ethoxysilyl group.

6. The composition according to claim 1 wherein the polymer (B) is an acrylic polymer having an epoxy content of 0.5 to 5.0 mmol/g, a hydroxyl value of 10 to 200 mg KOH/g and a hydrolyzable alkoxysilyl group content of 0.3 to 5.0 mmol/g.

7. The composition according to claim 1 wherein the crosslinked particulate polymer (D) is:

a crosslinked particulate polymer obtained by subjecting a polymerizable monomer having at least two radically polymerizable unsaturated groups in one molecule and other radically polymerizable unsaturated monomer to emulsification polymerization in the presence of a reactive emulsifier having an allyl group in a molecule, and/or a crosslinked particulate polymer obtained by polymerizing a radically polymerizable unsaturated monomer in an organic liquid in the presence of a dispersion stabilizing resin which is a polymer containing an alkoxysilyl-containing vinyl monomer as an essential monomer component.

8. The composition according to claim 1 wherein the proportions of the compound (A) and the polymer (B) are such that the equivalent ratio of the carboxyl group in the compound (A) to the epoxy group in the polymer (B) is 1:0.5 to 0.5:1, the proportion of the reactive organopolysiloxane (C) is 3 to 50 parts by weight per 100 parts by weight of the compound (A) and the polymer (B) in total, and the proportion of the crosslinked particulate polymer (D) is 1 to 20 parts by weight per 100 parts by weight of the compound (A), the polymer (B) and the reactive organopolysiloxane (C) in total.

9. A method for forming a topcoat comprising the step of successively forming a colored base coat and a clear topcoat on a substrate, said colored base coat and/or clear topcoat being formed from the coating composition of claim 1.

10. The method for forming a topcoat according to claim 9, the method comprising the steps of applying the composition for forming the colored base coat to a substrate, applying the composition for forming the clear topcoat to the uncured surface of the base coat, and curing the two coats by heating according to 2-coat 1-bake system.

11. The method for forming a topcoat according to claim 9 or 10 wherein the composition for forming the clear topcoat contains the coating composition of claim 1 as a resin component.

12. The method for forming a topcoat according to claim 9 or 10 wherein the composition for forming the colored base coat is an aqueous coating composition, or an organic solvent type coating composition having a solid concentration of 30 to 50% by volume when applied by spraying, and the composition for forming the clear topcoat is an organic solvent type coating composition having a solid concentration of 35 to 60% by volume when applied by spraying.

13. An article coated by the method according to any one of claim 9 or 10.

* * * * *